Figure 1:
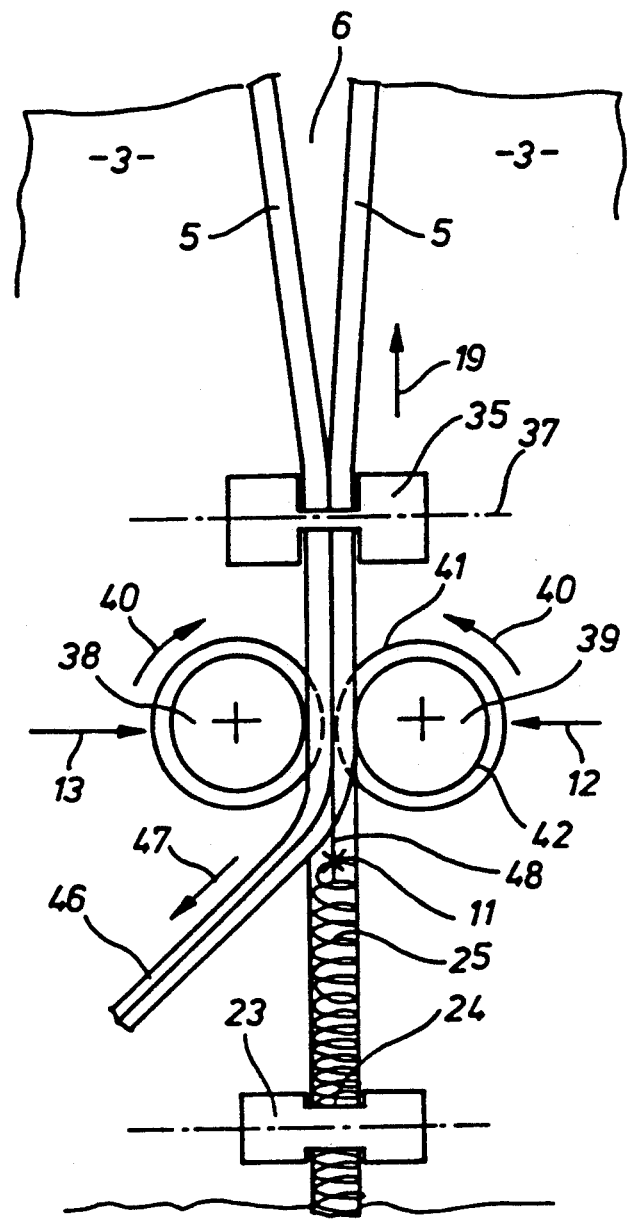

United States Patent [19]

Lipp

[11] Patent Number: 5,211,326
[45] Date of Patent: May 18, 1993

[54] METHOD OF MANUFACTURING A BUILT-UP METAL PLATE AND WELDING CARRIAGE FOR THE CARRYING OUT OF THE METHOD

[76] Inventor: Xaver Lipp, Hohenstaufer Str. 30, Ellwangen, Fed. Rep. of Germany 7090

[21] Appl. No.: 804,102

[22] Filed: Dec. 6, 1991

[30] Foreign Application Priority Data

Dec. 7, 1990 [DE] Fed. Rep. of Germany ....... 4039113

[51] Int. Cl.⁵ .............................................. B23K 28/02
[52] U.S. Cl. ..................................... 228/170; 228/5.1; 228/13; 228/173.7
[58] Field of Search ...................... 228/5.1, 13, 32, 17, 228/170, 173.3, 173.6, 173.7; 219/78.15, 83, 82, 121.14, 121.64

[56] References Cited

U.S. PATENT DOCUMENTS

| | | | |
|---|---|---|---|
| 2,329,938 | 9/1943 | Ortiz | 228/170 |
| 2,629,806 | 2/1963 | Anderson | 219/83 |
| 3,905,092 | 9/1975 | Houldcroft | 228/32 X |
| 4,769,522 | 9/1988 | Lentz et al. | 219/121.64 |

*Primary Examiner*—Kenneth J. Ramsey
*Attorney, Agent, or Firm*—Cooper & Dunham

[57] ABSTRACT

A method is described for manufacturing a built-up sheet panel by forming a double flanged joint with raised flange edges between sheets arranged alongside of each other, which are then welded together by means of a driven welding carriage, the raised flange edges being shortened in accordance with the invention shortly in front of the welding.

A welding carriage suitable for this purpose is provided on its lower side, in front of a welding device as seen in the direction of travel, with a parting device which is preferably developed as driven pair of cutting rollers. In this way in particular thin sheets can be assembled with excellent quality to form a sheet panel.

12 Claims, 3 Drawing Sheets

METHOD OF MANUFACTURING A BUILT-UP METAL PLATE AND WELDING CARRIAGE FOR THE CARRYING OUT OF THE METHOD

The present invention relates to a method of manufacturing a built-up sheet panel by forming a double flanged joint with raised flange edges between pieces of sheet metal laid alongside of each other and then welding them together by a driven welding carriage which is guided by the flange edges. Furthermore, the invention refers to a welding carriage for the carrying out of this method, having a welding device arranged on its lower side and guide rollers for the welding carriage on the flange edges.

Such a method and welding carriage are described in German Patent 37 39 359 Cl. In that case, pieces of sheet metal which are placed alongside of each other are welded together to form a large sheet panel and the raised flange edges of the sheet metal strips are placed, contacting each other, in one another, whereupon the welding carriage is moved along the flange edges and the latter welded together, whereby the built-up sheet panel is produced. In general, the material of the raised flange edges is used here for the welding, so that the flange edges disappear completely and only a weld seam remains visible.

This known welding method and known welding carriage are being used with great success for different thicknesses of sheet metal.

However, upon the welding of thin sheets there is the problem that a height of the flange edges of for instance 15–20 mm is required for the guidance of the welding carriage which rolls along the flange seams while a height of only about 4–6 mm is needed for the welding together of the flange edges.

A relatively large height of flange is also necessary in order to be able to press the sheets sufficiently accurately together by means of the guide device in the welding carriage in order to feed them to the welding process in this fixed position.

Another disadvantage of the known welding device of Federal Republic of Germany 37 39 359 Cl is that in that case the guide rollers of the welding device are arranged separately from the drive rollers, so that a higher machine expense results. Even two guide rollers spaced apart from each other and driven separately from each other were present in the said welding device.

Thus there are involved two opposing requirements, namely a relatively low height of flange for the welding process and, on the other hand, a relatively high height of flange for the guiding of the sheets with respect to each other and for controlling the welding device over the flange edge.

The object of the present invention is therefore so to develop a method for the manufacture of built-up sheet panels of the aforementioned type that the sheet panels can be optimally welded together and that (? with) the low height of the flange edges required in this connection, the welding device holds the relatively low flange edges together in optimal manner and can be guided along these flange edges.

In order to achieve this object, it is proposed, in accordance with the body of claim 1, that the welding device be connected with a parting device which cuts the raised flange edges or rims to the height required for the welding shortly before the start of the welding process.

One apparatus for carrying out this method is characterized, in accordance with claim 3, by the fact that a parting device is arranged fixed on the front of the welding device of the welding carriage as seen in the direction of advance and carries out the required parting process on the raised flange edges.

The height which is required for the welding and which is to be produced by the parting device depends on a large number of parameters. The height is determined by the required mass of material of the raised flange edges present after the parting in order to make certain that these flange edges are then welded flat to form a sheet panel within the meaning Federal Republic of Germany 37 39 359 Cl.

Reference is had to the disclosure of said patent. That disclosure is included in its entirety in the present invention.

There are a large number of possibilities for the development of the parting device, all of which are covered by the present inventive concept.

In a first important embodiment, the parting device is developed as travelling cutting knife, two cutting knives which lie opposite each other being present the cutting edges of which cut the flange edges to the required height. It is important in this connection that the cutting knives are developed at the same time as pressing and transport rollers and that thus only two cutting knives lying opposite each other are present, they at the same time exerting a pressing function against the still raised flange edge so that, as a result of this two-fold function of the cutting knives, the raised flange edges are at the same time brought together and pressed together, and then cut in this condition.

The speed of rotation of the cutting knives is infinitely variable and thus determines the advance of the entire welding device along the double flanged joint and thus also the speed of welding.

It is important, in this connection, that the cutting knives can in addition be pressed against the flange edges in a plane perpendicular to the side surface of said edges so as to assure a sufficiently large, friction-lock application of the pressing and transport rolls against the flange edges and at the same time optimally effect the cutting process.

In another embodiment it is provided that pressing and transport rollers are arranged opposite each other, separately from the cutting knives.

In this case, two cutting knives which lie opposite each other can be used, the pressing and transport rollers being arranged in front of and/or behind the cutting knives.

As already mentioned at the start, all known parting processes are claimed in the present invention.

In another embodiment therefore rotary shears are also claimed as part of the invention, so that instead of the rotating driven cutting knives described here, rotating shears which shear off the two raised flange edges are also present.

As third possibility which is to be included in the protection of the present invention, a laser cutting device is present which cuts off the raised flange edges by a laser beam.

As additional possibility there are claimed high-speed cutting knives which accordingly travel substantially faster in their speed of rotation than the speed of transport of the welding device along the weld seam.

A sawing-off of the raised flange edges by a parting saw also enters into consideration. The parting saw can in this connection be driven in oscillation or else in rotation.

In another embodiment of the present invention, during the manufacture of the flange edges, cross-section-reducing notches or grooves are produced in said edges, as seen in their longitudinal direction. Along these notches or cross-section-reducing grooves very simple parting or cutting of the raised flange edges then takes place.

By the expression "parting" there is accordingly also understood a tearing off of the raised flange edges in the region of the cross-section-reducing grooves or notches.

It is also possible, instead of cross-section-reducing grooves, to apply corresponding notches or perforations at the corresponding parting places.

The scope of the present invention does not extend only to the electrode welding described in Patent 37 39 359, but rather the present invention claims all welding processes which are part of the present state of the art. Such welding processes are, for instance, the electrode welding described in German Patent 37 39 359; however autogenous welding and thermite welding (powder welding) can also enter into consideration, as well as laser welding and furthermore all known welding processes which have not yet been mentioned above.

It is important in this connection that, depending on the method of welding used, the height of the flange edge to be cut off may be set differently. In this connection, it is also contemplated that the parting device be arranged in vertically adjustable manner on the welding device, in which case thus the height of the flange edge which still remains can be infinitely varied corresponding to the weld seam required. The height of the remaining flange edge depends— as stated above—on the mass of the remaining flange edges, which must be so selected that a flat melting together in the weld seam is obtained so as to produce a continuous sheet.

Instead of the adjustability in height of the parting device, the welding knives can also be developed suitably interchangeable and be replaced by cutting knives which apply a different parting cut at a different height.

It is furthermore important that with the use of travelling, simultaneously transporting, cutting knives a cut and at the same time a frictional lock against the raised flange edges must be applied in order to provide assurance that cutting and transporting are effected simultaneously. For this purpose, the cutting knives have corresponding pressing edges or surfaces with which they rest against the inner side of the raised flange edges and in this way assure transport of the cutting device along the raised flange edges by frictional lock.

It is important in this connection that the cutting knives be arranged at an angle to the horizontal or vertical and have their lower rounded radii extend up into the lower bend of the flange in order to assure there a support of the entire flange edge and the pressing together of the entire flange edge. In this way assurance is had that the cut flange edges are still firmly pressed together and then immediately, in this pressed-together state, fed to the welding. In this connection it is important that this pressing function lie as close as possible in front of the welding zone in order to assure optimal welding.

The inclination of the two cutting knives to the vertical is for the purpose that the lower rounded radii located in the bend of the flange leave no trace on the horizontal surface of the sheet upon the transport along the flange edges.

The invention will now be described in further detail with reference to several embodiments.

Figure 2:
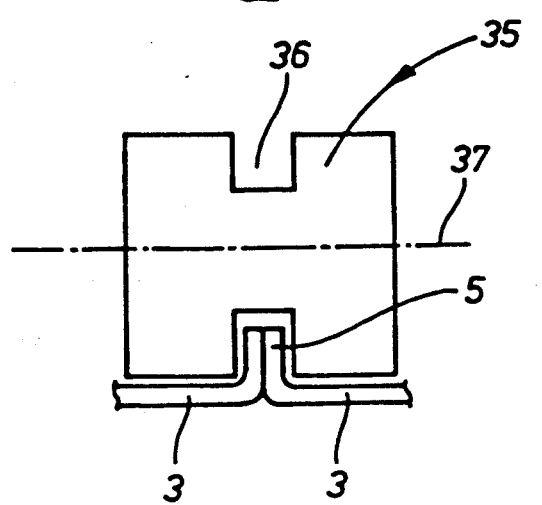
Figure 3:
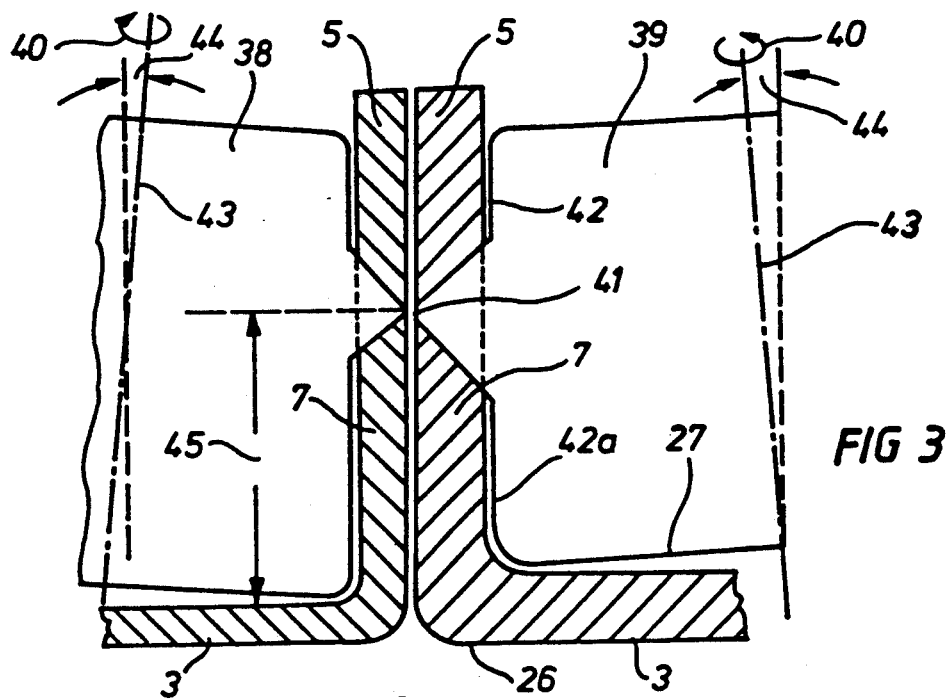
Figure 4:
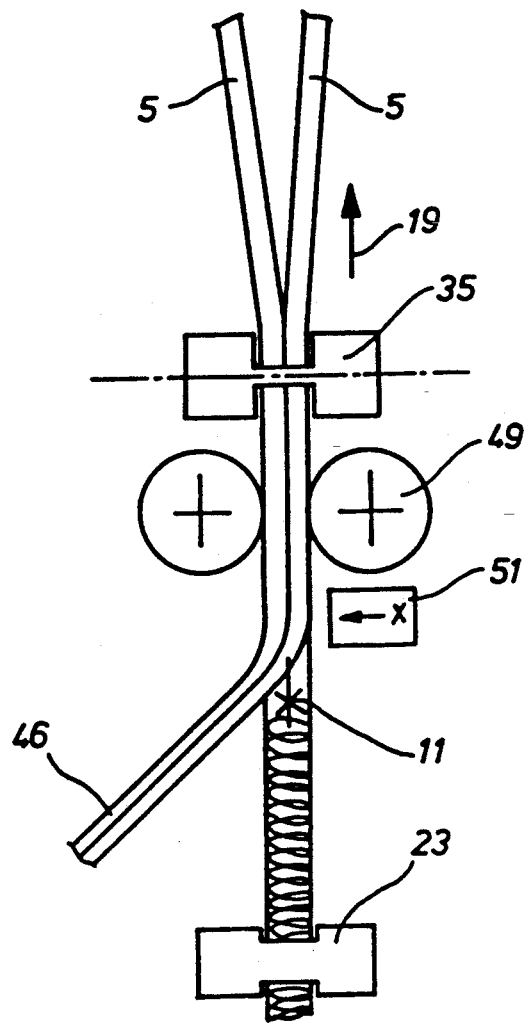
Figure 5:
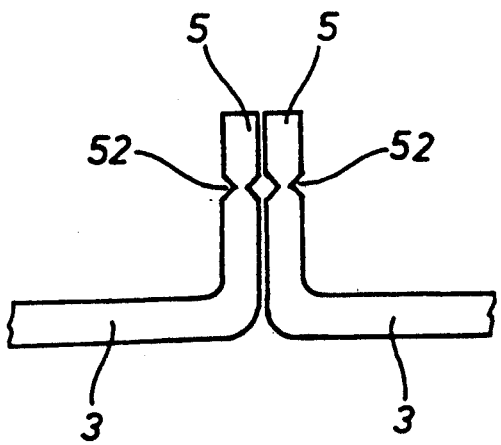
Figure 6:
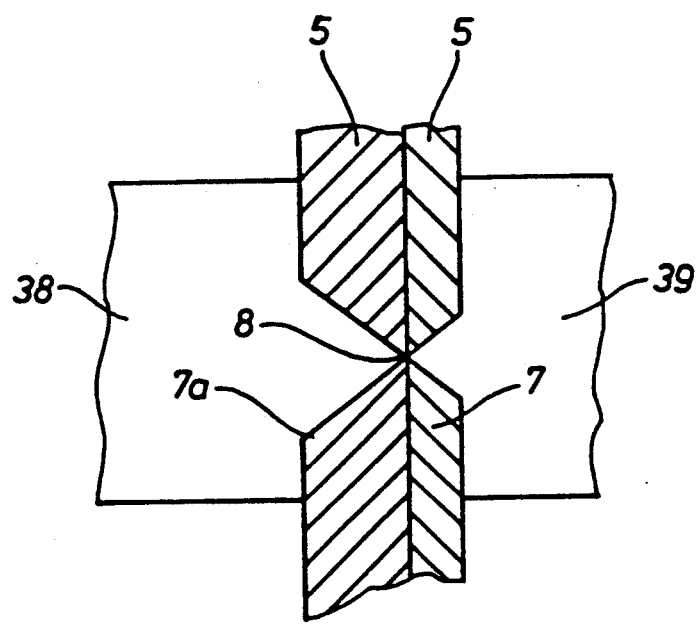
Figure 7:
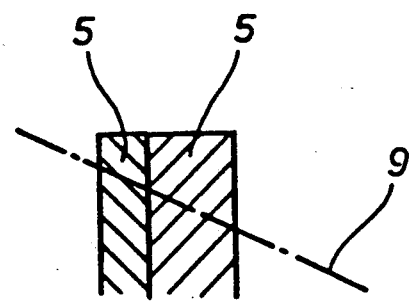

FIG. 1 shows in diagrammatic form and top view a welding device in accordance with the invention, FIG. 2 shows diagrammatically, in front view, the profiling of a guide roller, FIG. 3 is an enlarged section through the cutting rollers, FIG. 4 shows an embodiment which is modified as compared with FIG. 1, FIG. 5 shows a possibility for applying cross-section-reducing grooves to the flange edges, FIG. 6 shows a cut with the formation of a raised shoulder, and FIG. 7 is a view similar to FIG. 6 but shows another cut suitable in the case of flange edges of unequal thickness.

Referring to FIG. 1, two sheet panels 3 are provided with flanges 5 and these sheet panels 3 initially form a slight gap 6 in the region of the flanges.

In order to produce a flat sheet panel, each sheet panel is provided on its longitudinal edges with a flange 5 and the flanges 5 are now brought together by the device of the invention, pressed together in order then to be welded together.

The welding device consists of a front guide roller 35 which, in accordance with FIG. 2, has a grooved profile. The guide roller 35 in this connection is provided in its central section with a guide groove 36, the shape of which is adapted to the shape of the raised flanges. In this way, assurance is had that the guide roller 35 travels with slight play of the guide groove 36 over the flange 5 and that the entire welding device is thereby guided in the direction of transport 19.

A support roller 23 can be provided on the rear of the machine.

By the provision of two rollers 23, 35 which are spaced from each other assurance is had that the machine cannot tilt in vertical plane towards the plane of the sheet panels.

The rear supporting roller 33 also has a guide groove 24 the profile of which is adapted to at least the height of the resulting weld seam 25. In this way assurance is had that the supporting roller 23 travels on the surface of the sheet while this must also be assured in the case of the guide roller 35 in order to assure a flat tilt-free guidance of the welding device along the flange 5.

The axial length of the rollers 23, 35 is only diagrammatically indicated. Several of such rollers can of course also be provided in order also to avoid lateral tilting of the welding device.

The welding device may in this connection also have lateral support rollers.

In order to cut the raised flanges 5 at the required height 45, the parting device of FIG. 1 is provided. It consists of two cutting rollers 38, 39 facing each other each driven in rotation in the direction of rotation 40 and rolling along the raised flanges. In this way therefore the transport of the rolling device in the direction of transport 19 is at the same time assured.

The cutting rollers 38, 39 have a profiling such as shown in FIG. 3.

Adjoining each radially outer cutting edge 41 there is pressing edge 42 which rests with friction lock and under tension against the inside of the raised flanges 5 and thus presses these flanges together with a high force.

Shortly behind the cutting rollers 38, 39, the cut flanges, which are then present merely as a stump 7, are welded together.

This stump 7 is welded by the electrode arrangement (shown merely diagrammatically) having the electrode holder 11 so that a continuous weld seam 25 is obtained.

The mass of the flanges still remaining (stump 7) passes into the weld seam so that a flat weld seam of as little height as possible is produced.

Accordingly, it is important that the height 45 be adjustable in order to assure a running together of the weld seam 25 which corresponds to the mass of the stump 7.

FIG. 1 also shows that a deflection device 48 is present with which it is possible laterally to deflect the two waste strips 46 in the direction indicated by the arrow 47 and remove them.

FIG. 1 also shows that the two cutting rollers 38, 39 are urged towards each other in the direction of the arrows 12, 13 in order, on the one hand, to be able to effect the cutting process and, on the other hand, to assure the transport and pressing functions.

In accordance with FIG. 3, the axes of rotation 43 of the two cutting rollers 38, 39 are inclined at an angle 44 to the vertical. The purpose of this is to provide assurance that the lower pressing edge 42a of the rollers 38, 39 is applied only in the knee 26 of the flange and presses the stump 7 firmly together there. In this way assurance is had that the lower surface 27 of the rollers 38, 39 does not collide with the horizontal surface of the sheet panels 3.

Instead of the profiling of the cutting edge 41 which is shown here, other profilings are of course also possible.

FIG. 4 shows a modified embodiment in which the same reference numbers as in FIG. 1 have been used for the same parts.

Differing from the embodiment of FIG. 1, in this case there are shown only two pressing and transport rollers 49, 50 located opposite each other which assume the pressing and transport functions while on the other hand the cutting function is assured by a laser cutting device 51 which is located behind the pressing and transport rolls.

It is obvious that in addition to the pressing and transport rollers 49, 50 shown here, other pressing and transport rollers arranged in other places can be provided.

It is also possible to assign only the pressing function to one pair of rollers 49, 50 while the transport function is assigned to another pair of rollers 49, 50.

FIG. 5 furthermore shows that it is possible to provide the raised flanges with a groove 52 which weakens the cross section.

In this connection there is a possibility of providing the groove 52 only in each case on the outer sides of the flanges or—in another embodiment, as shown in FIG. 5—the groove 52 can also be provided on the inside and outside of the flanges 5.

The parting of the raised flanges on the other side of the groove 52 is then effected by tearing, parting or cutting.

The essence of the present invention is therefore that it satisfies two contradictory requirements. On the one hand, a relatively high flange edge is required in order to press the flanges in as form-locked a manner as possible against each other and to effect the welding in this condition, while at the same time this requirement is also stipulated in order to guide the welding device optimally along the flange edges. This requirement, however, is opposed to the other requirement of creating an ideal welding seam, namely a weld seam which runs into itself and is as flush as possible with the plane of the sheet panels. Accordingly, particularly in the case of thin sheets, one must select a relatively low height of flange, which then no longer makes it possible to press the flanges tightly and in form-locked manner against each other and feed them in this condition to the welding, while on the other hand this low flange height no longer permits optimal guidance of the welding device. Only as a result of the parting device provided in accordance with the invention and by the method of the present invention therefore are these two contradictory requirements satisfied in optimal manner.

It is furthermore claimed as essential to the invention that not only a horizontal cut is effected through the two flanges 5 facing each other but that an oblique cut is also effected.

FIG. 3 shows namely that flanges 5 of different thickness of material can also be welded to each other.

In this connection, it can be noted from FIG. 6 that two flanges 5 of different thickness of material are cut with a different bevel resulting in a shoulder 8 so that the amount of material in the thinner cross section of the remaining stump 7 is practically the same as or at least similar to the amount of material of the thicker stump 7a.

In the same way it is possible, as shown in FIG. 7, to apply an oblique cut 9 which has the same purpose, namely to reduce the material of the thick flange edge and to increase the material of the thinner flange edge as compared therewith so as to assure uniform influence in the weld seam.

However, in view of the specific situation the cut 9 may also be applied at a different angle through the two different flanges 5.

I claim:

1. A method of manufacturing a built-up sheet panel comprising the steps of:
   locating sheet metal panels alongside of each other,
   forming a double flanged joint with raised flange edges between said sheet metal panels by feeding separate sheet metal edges relative to a welding carriage, said sheet edges being mated together but not welded prior to engagement by said carriage,
   guiding said welding carriage along the flange edges,
   welding said flange edges together by means of said welding carriage, and
   shortening the raised flanged edges shortly before effecting the welding.

2. A method according to claim 1, comprising the further step of providing weakened zones in the flanges, said shortening being effected by parting the flanges along said weakened zones.

3. A method according to claim 1 or 2 with a welding device arranged on its lower side and with guide rollers for the welding carriage on the flange edges, characterized by the fact that a parting device (38, 39) for the flange edges (5, 5) is provided on the bottom of the welding carriage in front of the welding device (11) in the direction of travel (19) of said carriage.

4. A method according to claim 3, characterized by the fact that the parting device comprises a pair of cutting rollers (38, 39).

5. A method according to claim 4, characterized by the fact that the cutting rollers (38, 39) are driven.

6. A method according to claim 5, characterized by the fact that the cutting rollers have pressing surfaces or pressing edges.

7. A method according to claim 5, characterized by the fact that the drive of the cutting rollers (38, 39) is continuously variable.

8. A method according to claim 4, characterized by the fact that the cutting rollers are arranged at an angle to the horizontal and have lower rounded edges.

9. A method according to claim 4, characterized by the fact that the distance between the cutting rollers (38, 39) is adjustable.

10. A method according to claim 3, characterized by the fact that the parting device comprises roller shears, laser cutting device or cutting saw.

11. A method according to claim 3, characterized by the fact that the height of the parting device is adjustable.

12. Apparatus for manufacturing a built-up sheet panel from two sheet metal panels located alongside of each other, said apparatus comprising:
- means forming a double flange joint with raised flange edges between said sheet metal panels;
- a welding carriage;
- means for guiding said welding carriage along the flange edges;
- means for welding said flange edges together; and
- means for shortening the raised flange edges shortly before effecting any welding.

* * * * *